June 3, 1969  H. J. SILVEY  3,447,443
DAMPER ASSEMBLY
Filed Oct. 16, 1967
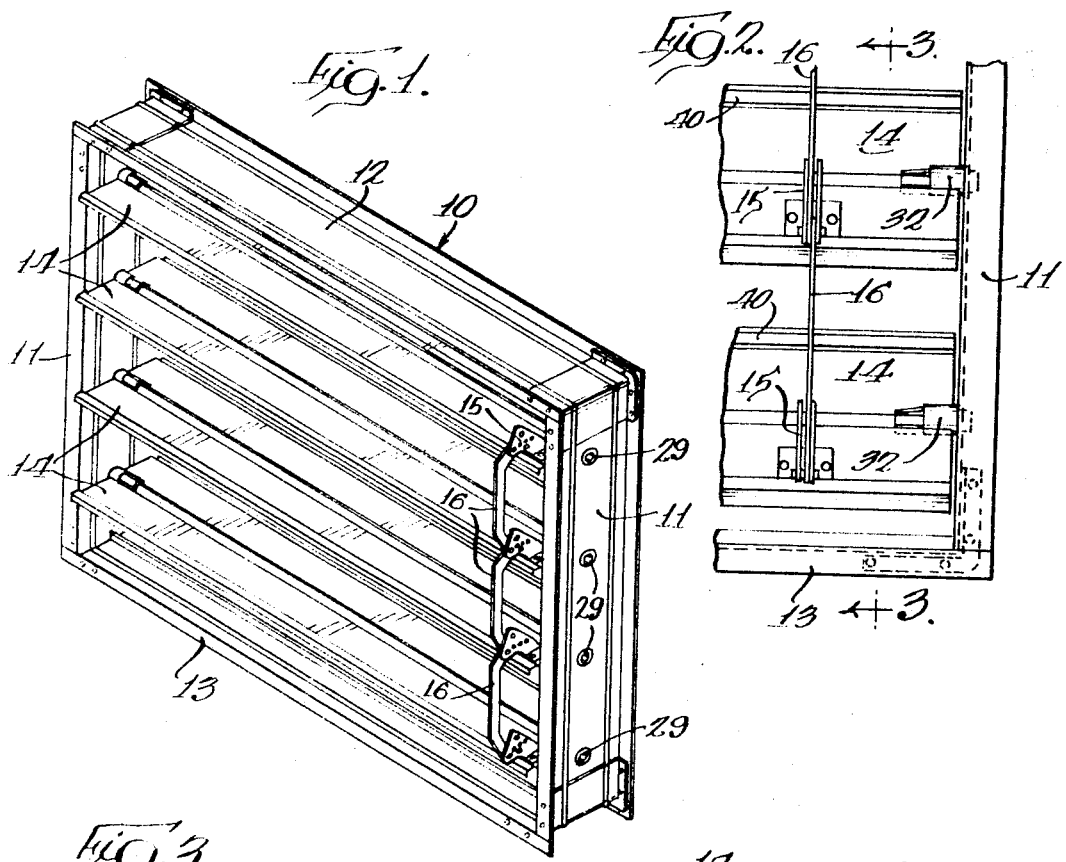
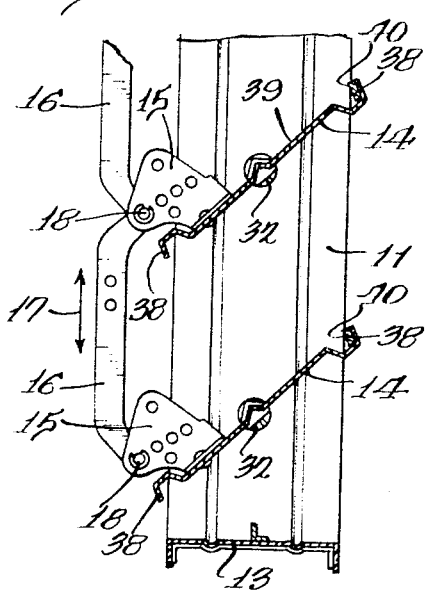
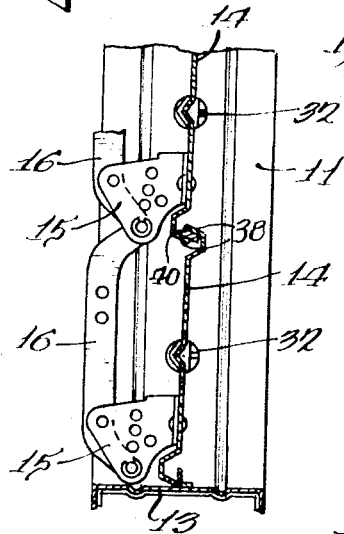
Inventor
Harry J. Silvey
By Hofgren, Wegner,
Allen, Stellman & McCord
Att'ys June 3, 1969 H. J. SILVEY 3,447,443
DAMPER ASSEMBLY
Filed Oct. 16, 1967 Sheet 2 of 2
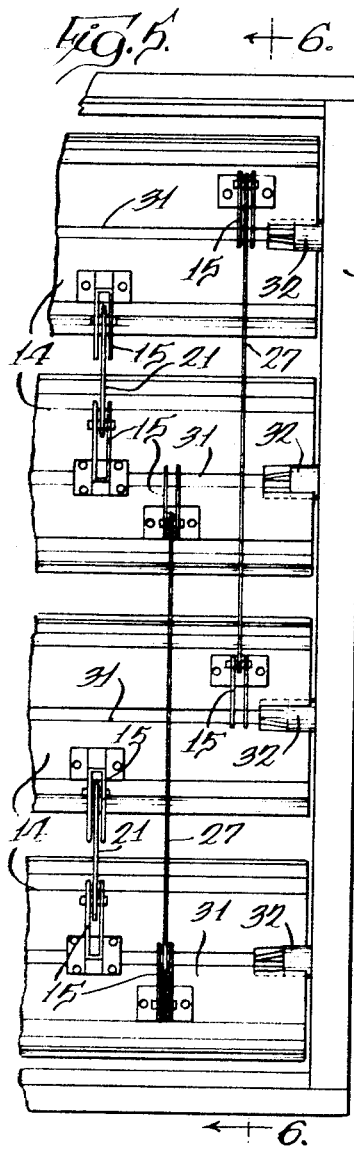
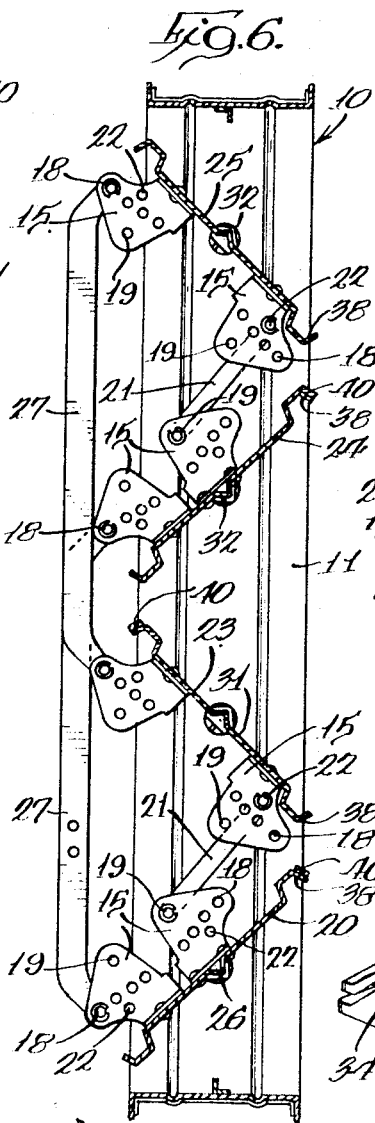
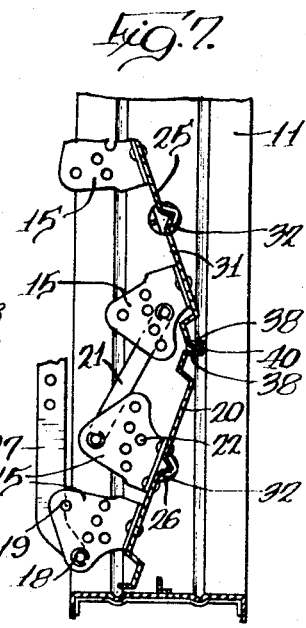
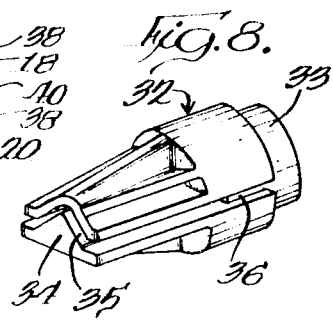
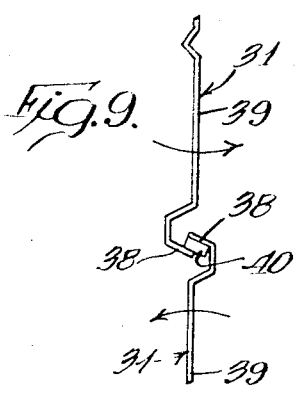
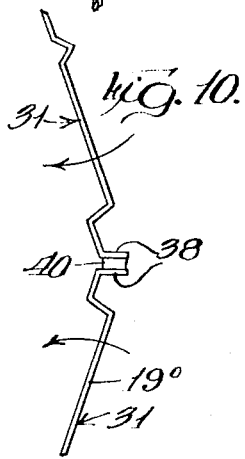
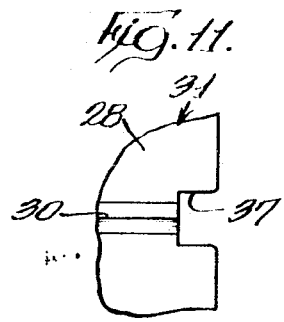

United States Patent Office 3,447,443
Patented June 3, 1969

3,447,443
DAMPER ASSEMBLY
Harry J. Silvey, Hudson, Ill., assignor to Modine Manufacturing Company, a corporation of Wisconsin
Filed Oct. 16, 1967, Ser. No. 675,477
Int. Cl. F24f *13/06, 13/08*
U.S. Cl. 98—110                                                10 Claims

ABSTRACT OF THE DISCLOSURE

A damper assembly that comprises a plurality of dampers extending between a pair of opposite side frame members for controlling fluid flow between the frame members and including linkages and brackets interconnecting the dampers for movement either parallel to each other or in opposition but with all brackets that are mounted on the dampers being substantially identical in all cases, the assembly also including improved combined blade locking and bearing members for rotatably mounting each of the dampers and improved gasket sealing means for sealing the edges of the dampers when they are moved to closed position whether an adjacent pair of dampers moves in parallel to each other or in opposition.

---

The damper assembly of this invention comprises the usual pair of opposite side frame members and a plurality of rotatably mounted dampers that are rotatable in the opening formed by the frame members to control fluid flow therethrough.

The invention will be described in conjunction with certain embodiments thereof as shown in the accompanying drawings. Of the drawings:

FIGURE 1 is a perspective view of one embodiment of the invention in which the plurality of dampers are movable in parallel.

FIGURE 2 is a fragmentary front elevational view of the embodiment of FIGURE 1 showing the dampers in partially open position.

FIGURE 3 is a vertical sectional view taken substantially along line 3—3 of FIGURE 2.

FIGURE 4 is a view similar to FIGURE 3 but showing the dampers in closed position.

FIGURE 5 is a fragmentary front elevational view similar to FIGURE 2 but showing the entire set of dampers and with adjacent pairs of dampers being arranged for movement in opposition.

FIGURE 6 is a vertical sectional view taken along line 6—6 of FIGURE 5.

FIGURE 7 is a fragmentary view similar to FIGURE 6 but showing only the bottom adjacent pair of dampers in closed position.

FIGURE 8 is a perspective view of a combined blade locking and bearing member used to rotatably mount each end of a blade and to lock it in position relative to lateral shifting thereto.

FIGURE 9 is a fragmentary end elevational view of a pair of closed adjacent dampers mounted for movement in parallel with each other.

FIGURE 10 is a view similar to FIGURE 9 but illustrating similar dampers mounted for movement in opposition to each other.

FIGURE 11 is a fragmentary plan view of an end of a damper blade.

In the embodiment of FIGURES 1-4 and 9 the damper assembly 10 comprises a pair of opposite side frame members 11 and top 12 and bottom 13 frame members arranged in a rectangle. Extending between the opposite side frame members 11 and journalled therein for rotational movement between the open position of FIGURE 1 and the closed position of FIGURE 4 are a plurality of dampers 14.

Mounted on and extending from each damper 14 is a bracket 15 with all brackets being substantially identical. The brackets are rotatably interconnected by a plurality of linkage arms 16 so that force applied to one linkage arm as by an air motor (not shown) to move it either up or down, as illustrated by the arrow 17, will move all linkages and thus all dampers 14 with these dampers maintaining their parallel arrangement throughout their movement.

The brackets 15 are substantially identical both in the embodiment of FIGURE 1 and the embodiment of FIGURE 5 where adjacent dampers are moved in opposition to each other. In order to provide this standardized bracket construction each bracket as shown has six areas of linkage connection, here shown as holes in the brackets, to which the ends of the linkages may be rotatably connected. Thus in the illustrated embodiments each bracket 15 has a set of linkage connection areas or holes with the areas in each set being spaced different distances from its damper blade. Of these areas a first area 18 of a first bracket 15 on each of the adjacent pair of dampers 14 is interconnected by a linkage 16 when turning the pair of dampers 14 in parallel. Then, a second area 19 on a second bracket 15 on one damper 20 is connected by a linkage 21 to a third area 22 of a third bracket 15 on another damper 23 when the pair of dampers 20 and 23 are turned in opposition. In all of the brackets the first area 18, second area 19 and third area 22 have the same relative position. This means that all brackets may be used interchangeably but only one area or opening 18, 19 or 22 is used at a time depending upon the direction of rotation desired in the damper of which the bracket is a part.

Thus in the embodiment of FIGURES 5–7 there are disclosed four dampers with the first damper 20 and the third damper 24, progressing from the bottom of the assembly 10, being interconnected for parallel movement by a relatively long linkage 27 with each end connected to a first area 18 on a bracket 15 and with one bracket 15 being mounted adjacent an edge of the first damper 20 and the other end similarly connected to a similar bracket 15 on the third damper 24.

In the embodiment as shown in FIGURE 6 adjacent dampers, which are the first damper 20 and second damper 23 making up one adjacent pair and the third damper 24 and a fourth damper 25 constituting the next pair, are interconnected for movement in opposition. To achieve this a bracket 15 is mounted at the axis of rotation 26 of the first damper 20 while a bracket 15 is mounted at the adjacent edge of the next damper 23. Then a relatively short linkage 21 interconnects the second area 19 on this axial bracket 15 with the third area 22 on bracket 15 that is next to the adjacent edge of the damper 23.

Then the second damper 23 and the fourth damper 25 are interconnected by a relatively long linkage 27 in the manner previously described for parallel movement, and third and fourth dampers 24 and 25 are connected for opposition movement. With this arrangement force applied to either one of the linkages 27 will cause adjacent dampers 20 and 23 and 24 and 25 to move in opposition and alternate dampers 20 and 24 and 23 and 25 to move in parallel.

Each damper 14, 20 and 23–25 comprises a thin blade having opposite end areas 28 of non-linear transverse contour adjacent mounting openings 29 in the side frame members 11. In the illustrated embodiments this non-linear arrangement is provided by a central V-shaped groove 30 along the longitudinal axis of each blade 31.

Each blade 31 is locked in position and simultaneously mounted for rotational movement by a combined blade locking and bearing member 32. Each member 32 has a circular bearing portion 33 of reduced diameter rotatably held in an opening 29. The inner extended end 34 of each bearing member 32 is provided with a narrow extended groove 35 also of non-linear configuration similar to that of the end area 28 in order to receive this end area. In the illustrated embodiment, as mentioned earlier, this non-linear configuration is the V-shaped groove shown. In addition to the V-shaped construction which is intended to lock each end of the blade against lateral movement relative to its bearing member 32, there is also provided a tongue 36 (FIGURE 8) at the outer end of the groove 35 with respect to the blade 31. This tongue 36 which is generally rectangular is adapted to engage a tongue-shaped recess 37 (FIGURE 11) at the outer end of each blade and this in conjunction with the central configuration locks each end of the blade firmly against lateral movement.

In preferred constructions the combined blade locking and bearing member is a solid plastic that has the surface characteristic of a so-called frictionless bearing. A typical plastic of this nature is nylon, although there are of course many others that can be used.

In the preferred construction each damper comprises the thin blade 31 with opposite side edges 38 reversely bent to provide an angled flange and an intermediate body portion 39 between these edge flanges 38. The angle portion or edge on one blade of an adjacent pair overlaps the angled flange 38 of the next blade when the dampers are moved in parallel to closed position as shown in FIGURE 9. Similar blades with similar angled flanges 38 are arranged in abutting relationship as shown in FIGURE 10 when the dampers are moved in opposition. In order to provide a fluid seal these edges therefore are provided with a sealing gasket 40 that is located on the inner surface of an angled flange 38 when these edge flanges abut as shown in FIGURE 10. As can be seen, each damper blade 31 is identical with the others whether the dampers are arranged for parallel or opposition movement. Similarly all of the brackets for connecting the blades to each other are identical whether the brackets are used to connect the blades for movement in parallel or in opposition.

In one construction where the blades are moved in parallel these blades are mounted so that when they are closed as in FIGURE 9 the blades are substantially coplanar. By using the same size blades, the same size frame members 11 and the same spacing between the mounting openings 39, these blades 31 will then be arranged at an angle less than 180° when the blades move in opposition to each other and thus adjacent edge flanges 38 abut. This angular closed position is actually preferred because it is possible to get a more secure seal in that the operating motor (not shown) to open and close the dampers in unison applies its sealing force before the motor reaches its limit of movement. In addition, when the dampers are first moved to open position a movement of a very small linear distance will open the dampers a considerable width.

I claim:

1. A damper assembly, comprising: a pair of opposite side frame members; a plurality of dampers extending between said frame members and journalled therein for rotational movement between open and closed positions, each about a longitudinal axis of rotation; a plurality of substantially identical brackets mounted on and extending from said dampers; a plurality of linkages rotatably interconnecting a bracket on one damper with a bracket on another damper for joint movement of said dampers, all brackets having substantially identical sets of three areas each of linkage connection, the areas in each set being spaced different distances from its damper, a first area of a first said bracket on each of a pair of dampers being interconnected by a linkage when turning said pair in parallel, and a second area of a second bracket on one damper being connected by said linkage to a third area of a third bracket on another damper when turning the latter pair of dampers in opposition, all said first brackets being spaced substantially the same first distance from its damper axis, all said second brackets being spaced substantially the same second distance from its damper axis and all said third brackets being spaced substantially the same third distance from its damper axis.

2. The damper assembly of claim 1 wherein each said second bracket of said latter pair is closer to its damper axis than is the corresponding third bracket to its damper axis.

3. The damper assembly of claim 2 wherein each said second bracket is positioned substantially on its said damper axis.

4. The damper assembly of claim 1 wherein each said second bracket of said latter pair is closed to its damper axis than is the corresponding third bracket to its damper axis, each damper has opposite longitudinal edges, and each said third bracket is located adjacent the said longitudinal edge that is nearer said second bracket when said dampers have been moved toward closed positions.

5. The damper assembly of claim 1 wherein each damper has a pair of opposite longitudinal edges and each said first bracket is loacted on its damper adjacent one of said edges, said one edge being the same on all thusly interconnected dampers.

6. The damper assembly of claim 1 wherein said side frame members have aligned openings, each damper comprises a thin blade having opposite end areas of non-linear transverse contour adjacent said frame member openings and there are provided a combined blade locking and bearing member at each end of said blade rotatably held in a said opening and having a narrow transverse groove of non-linear configuration similar to that of said end area receiving a said end area, means defining a tongue in each bearing at the outer end of the bearing groove, and means defining a tongue shaped recess in the corresponding end of each blade receiving a said tongue, the tongues, recesses, grooves and said areas serving to lock said blade against substantial lateral shifting relative to said bearing member.

7. The damper aseembly of claim 1 wherein each damper comprises a thin blade having opposite side edges and an intermediate body portion and all extending between said side frame members, and there are provided means mounting all said dampers for rotational movement between open and closed positions about axes of rotation with adjacent pairs of dampers being movable seselectively in parallel and in opposition, means forming a portion of each said side edge at an angle to said body portion, said angle portion of one blade of an adjacent pair of blades overlapping an angle portion of the other blade of said pair when said dampers are moved in parallel to closed positions and said angle portions abutting when said pair of dampers are moved in opposition to closed positions, and gasket seal means on an inner surface of a said angle portion of one blade of said pair when said blades thusly overlap and on the outer surface of said angle portion when said blades thusly abut, all said blades being substantially indentical and having means for spacing adjacent blades so that their said intermediate body portions are substantially coplanar when said edge portions thusly overlap and define an angle of less than 180° when said edge portions thusly abut.

8. A damper assembly, comprising: a pair of opposite side frame members having aligned openings; a damper comprising a thin blade having opposite end areas of non-linear transverse contour adjacent said frame member openings; a combined blade locking and bearing member at each end of said blade rotatably held in a said opening and having a narrow transverse groove of non-linear configuration similar to that of said end area receiving a said end area; means defining a tongue in each bearing at the outer end of the bearing groove; and means defining a tongue shaped recess in the corresponding end of each blade receiving a said tongue, the tongues, recesses, grooves and said areas serving to lock said blade against substantial lateral shifting relative to said bearing member.

9. A damper assembly, comprising: a pair of opposite side frame members; a plurality of dampers each comprising a thin blade having opposite side edges and an intermediate body portion and all extending between said side frame members; means mounting all said dampers for rotational movement between open and closed positions about axes of rotation with adjacent pairs of dampers being movable selectively in parallel and in opposition; and means forming a portion of each said side edge at an angle to said body portion, said angle portion of one blade of an adjacent pair of blades overlapping an angle portion of the other of said pair when said dampers are moved in parallel to closed positions and said angle portions abutting when said pair of dampers are moved in opposition to closed positions.

10. The damper assembly of claim 9 wherein there are provided gasket sealing means on an inner surface of a said angle portion of one blade of said pair when said blades thusly overlap and on the outer surface of said angle portion when said blades thusly abut, all said blades being substantially identical and having means for spacing adjacent blades so that their said intermediate body portions are substantially coplanar when said edge portions thusly overlap and define an angle of less than 180° when said edge portions thusly abut.

References Cited
UNITED STATES PATENTS

| | | | |
|---|---|---|---|
| 3,017,899 | 1/1962 | Goldsmith | 49—78 |
| 3,044,387 | 7/1962 | Hinden | 49—78 |
| 3,267,962 | 8/1966 | Josephensen | 98—110 |
| 3,366,032 | 1/1968 | Alamprese | 98—121 |
| 3,381,601 | 5/1968 | McCabe | 98—121 |

MEYER PERLIN, *Primary Examiner.*

U.S. Cl. X.R.

49—78; 98—121; 137—601